(12) United States Patent
Sreepathi-Komanduri et al.

(10) Patent No.: US 7,746,992 B2
(45) Date of Patent: Jun. 29, 2010

(54) ADAPTIVE HANDLING OF PULSE-TRAIN SIGNALS IN A VOICE GATEWAY

(75) Inventors: Sampat Tiru Sreepathi-Komanduri, Sunnyvale, CA (US); Sushma Srikanth, Sunnyvale, CA (US); Malathi Anand, San Jose, CA (US); Ashwani Dahiya, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1554 days.

(21) Appl. No.: 10/922,069

(22) Filed: Aug. 19, 2004

(65) Prior Publication Data

US 2006/0041439 A1  Feb. 23, 2006

(51) Int. Cl.
 *H04M 15/00* (2006.01)
(52) U.S. Cl. ................... 379/124; 379/114.01; 370/352
(58) Field of Classification Search ................. 370/352, 370/401, 493–495; 379/102.07, 121.09, 379/281, 286, 114.01, 114.03, 114.28, 124, 379/133, 137, 141
See application file for complete search history.

(56) References Cited

U.S. PATENT DOCUMENTS

| 4,013,838 A | * | 3/1977 | Tsai ...................... 379/102.07 |
| 5,946,614 A | * | 8/1999 | Robbins et al. ............. 455/407 |
| 6,760,324 B1 | * | 7/2004 | Scott et al. .................. 370/352 |
| 2002/0122429 A1 | * | 9/2002 | Griggs ....................... 370/401 |
| 2005/0135578 A1 | * | 6/2005 | Ress et al. .................. 379/124 |

OTHER PUBLICATIONS

ITU—Telecommunication Standardization Sector, "Corrigendum 1 to Recommendation H.248 (Jun. 2000)", Publication, Geneva, Feb. 5-15, 2002, 132 pages.

* cited by examiner

*Primary Examiner*—Quoc D Tran
(74) *Attorney, Agent, or Firm*—Trellis IP Law Group, PC

(57) ABSTRACT

A system and method provide for adaptively monitoring and reporting pulse train characteristics. In one embodiment a DSP operating within a voice media gateway (VMG) is initialized with signal processing criteria, at least one control parameter and, optionally, one or more pulse train characteristic indicators for indicating pulse train characteristics to be determined or reported in accordance with the control parameter or parameters.

19 Claims, 5 Drawing Sheets ns 102 and 112 of FIGS. 1A and 1B respectively) and
ADAPTIVE HANDLING OF PULSE-TRAIN SIGNALS IN A VOICE GATEWAY

FIELD OF INVENTION

Embodiments of the present invention relate generally to network services, and more specifically, to more effective monitoring and reporting of status and control signals, such as pulse trains, in a voice gateway.

BACKGROUND OF THE INVENTION

Various mechanisms for indicating the occurrence and/or extent of telephone calls or other voice/multimedia signals over a switched network are well known. Channel Associated Signaling (CAS), for example, remains widely used in voice media gateways (MGs) of many developing countries in conjunction with R2 signaling protocols for detecting pulse train type metering signals used in billing telephone calls. Such mechanisms typically provide a digital signal processor (DSP) within an MG that receives predetermined signal detection constraints from an MG controller or by user via configuration interface. For simplicity we are considering only the first case in this document. The DSP uses the constraints to identify received pulse train pulses for determining a pulse count or train frequency, and transmits a resultant value back to the MG controller (MGC). However, conventional signal handling may well fail to meet sometimes competing operational characteristics, such as scalability, accurate signal detection, efficient and complete signal reporting, and count or statistical information preservation.

Representative conventional R2 variants include predetermined signal processing constraints: minimum recognition time (MinMake), maximum recognition time (MaxMake), minimum break time (MinBreak), maximum break time (MaxBreak), current receive pattern (CurrRx), previous Rx Pattern (PreRx) and current transmit pattern (CurrTx).MG receives from the MGC the following: a pulse-reporting variant, a pulse count reporting variant and a frequency change reporting variant.

Pulse-reporting R2 variants provide for detecting and reporting to an external application (executed on a different processor) each pulse occurring in conjunction with each telephone call handled by the MG. The external application counts the number of pulses received during a succession of fixed time durations to detect pulse train frequency changes, and informs the media gateway controller (MGC) of the changes. Unfortunately, fixed period frequency detection with ongoing pulse reporting is incapable of assuring accurate pulse detection or efficient reporting (e.g., see FIGS. 1A and 1B). It also lacks scalability for handling high call rates. For example, based on an origination and destination of a call, as many as three metering pulses per second could be received during a call. In high-density gateways such as a 48E1-compatible gateway (having 1536 ports) the number of pulses that the application processor receives from DSP may therefore be on the order of 4608 pulses per second—well above this variant's ability to conduct pulse tracking and reporting.

In current pulse count reporting, the DSP counts the number of pulses that are received by the MG on a particular channel and the external application polls the DSP for a pulses count at various times. The application then attempts to use the received pulse count to derive the frequency of the incoming pulse train. Unfortunately, high call volumes may nevertheless result in low system performance; conversely, too low of a call volume may produce a delay in reporting pulse train metering and result in erroneous call charge reporting. Worse yet, a DSP/system malfunction (e.g., DSP crash or system reset) may well result in a standby system having an incorrect number of pulses as having been detected by a previously active DSP. Thus, while a newly active card (NAC) may attempt to derive a number of pulses received by a previously active card (PAC), a frequency change just before an application polls the DSP would result in incorrect information being conveyed to the MGC.

In basic frequency change reporting mechanisms, DSP counts the number of pulse train pulses received in successive predetermined, fixed time durations (e.g., indicated as fixed durations 102 and 112 of FIGS. 1A and 1B respectively) and calculates a pulse frequency corresponding to each detected fixed-duration number of pulses. Unfortunately, such a mechanism may result in an excessive number of frequency-change-notifications (FCN) to the application—even where the pulse train frequency is static. (e.g., see pulse train 110 of FIG. 2). While hysteresis-correcting algorithms might be used, reporting of even a slight valid change may be delayed, resulting in errors in applications such as call charge metering.

The above R2 variants also share certain common problems. For example, the predetermined and fixed manner in which the DSP operates may not be desirable in conjunction with a particular application. The predetermined and fixed pulse tracking that is reported, polled or used to calculate a then reported frequency is also, in each case, subject to producing erroneous results, among other problems.

Accordingly, there is a need for a mechanism that avoids the problems encountered with conventional CAS implementations.

SUMMARY OF EMBODIMENTS OF THE INVENTION

Embodiments of the present invention provide for adaptive monitoring and reporting of received control/status signals, such as pulse trains, thereby enabling problems encountered with prior mechanisms to be avoided. In one embodiment, a pulse train processor, and more preferably a media gateway (MG) based digital signal processor (DSP), provides for receiving signal processing and control parameters and for monitoring, processing and/or reporting received pulse train characteristics in accordance therewith. The signal processing and control parameters preferably include pulse identifying, notifying, and frequency calculating criteria according to which the DSP can accurately determine a received pulse train pulse count, frequency or frequency change, or provide pertinent pulse train characteristics to a receiving application according to mechanism requisites. Embodiments also enable the DSP to provide journal characteristics to a standby mechanism, and so on, or some combination thereof. Embodiments of the invention further provide for forming an integrated identifying, notifying, and frequency calculating parameter that is further useable in conjunction with prior signal processing parameters. Embodiments still further provide systems and methods for adapting received signal monitoring/analyzing to a received signal, and for providing received signal analysis results to one or more result receivers according to requisites of one or more result receivers, among other combinable aspects.

A method according to an embodiment of the invention that is operable in a pulse train receiving media (MG) gateway includes receiving pulse train signal processing criteria and at least one pulse train processing control parameter indicating processing to be conducted on a received pulse train, the parameter corresponding to a pulse train characteristic utilizing application. The method further includes receiving a pulse train including pulse train pulses, processing the pulse train according to the pulse train processing control indicator to produce a corresponding pulse train characteristic, and transferring the pulse train characteristic to the pulse train characteristic utilizing application.

Another method according to an embodiment of the invention includes producing a pulse indicator corresponding to each received pulse train pulse if the pulse train processing control parameter indicates a first value, determining a total count of received pulse train pulses corresponding to a call if the pulse train processing control parameter indicates a second value and determining a pulse train frequency change if the pulse train processing control parameter indicates a third value that is different from the first value and the second value.

A further method according to an embodiment of the invention provides for responding to a control parameter indicating that a frequency change of a pulse train is to be determined by counting a number of pulses corresponding to a first pulse train segment, determining a first time interval corresponding to receiving the pulses, determining a second time interval of a later pulse train segment during which the number of pulses is again received, and comparing the first time interval and the second time interval.

A system according to an embodiment of the invention provides an adaptive signal processor for receiving pulse train signal processing criteria and at least one pulse train processing control parameter indicating processing to be conducted on a received pulse train, receiving a pulse train including pulse train pulses and processing the pulse train according to the pulse train processing control indicator to produce a corresponding pulse train characteristic. The system also includes an adaptive reporter for responding to the control parameter by transferring the pulse train characteristic to a pulse train characteristic utilizing application.

A further embodiment according to the invention includes a machine-readable medium having stored thereon instructions for receiving pulse train signal processing criteria and at least one pulse train processing control parameter indicating processing to be conducted on a received pulse train, the parameter corresponding to a pulse train characteristic utilizing application. The method further includes receiving a pulse train including pulse train pulses, processing the pulse train according to the pulse train processing control indicator to produce a corresponding pulse train characteristic, and transferring the pulse train characteristic to the pulse train characteristic utilizing application.

Advantageously, embodiments of the invention enable multiple notifications of each pulse occurrence to be avoided, for example, by learning a changed frequency and notifying the same to a corresponding application. Embodiments also enable hysteresis to be avoided, processing to be accurately conducted on a pulse-train comprising a repetitive-signal that is identifiable by set of pulses (e.g., coin-collect signal) and/or predetermining of a time interval and problems associated with predetermining to be avoided. Embodiments still further enable polling of a pulse train processor, such as a DSP, to be avoided, along with the lack of scalability (e.g., high call volume) inherent to current polling systems. Embodiments also enable a pulse train processor to provide an accurate frequency change in a received pulse-train to a frequency-utilizing application almost instantaneously. Embodiments thus enable application to further journal the information to a standby processor or gateway (e.g., thereby ensuring that information is available across switchovers), store the information, provide the information or information derived therefrom to a service provider, and so on, in accordance with the requirements of a particular application.

DETAILED DESCRIPTION OF EMBODIMENTS OF THE INVENTION

Figure 1A:
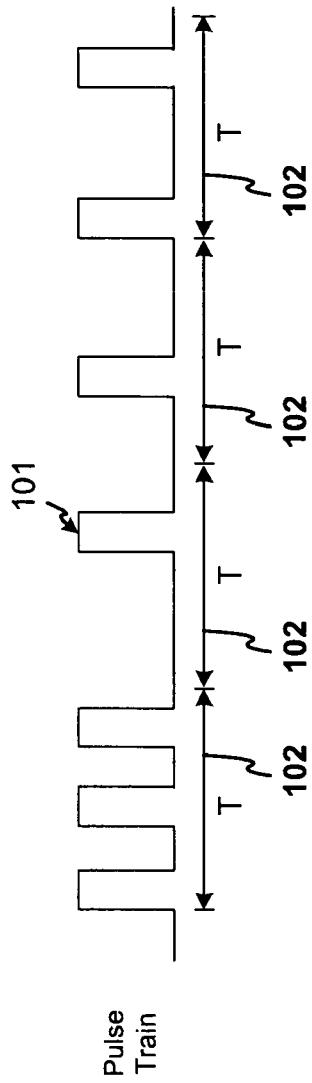
FIG. 1A illustrates an example of a pulse train as processed according to a prior art pulse train processing method.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer" for purposes of embodiments of the present invention may include any processor-containing device, such as a mainframe computer, personal computer, laptop, notebook, microcomputer, server, personal data manager or "PIM" (also referred to as a personal information manager or "PIM") smart cellular or other phone, so-called smart card, settop box or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain and store the computer program for use by or in connection with the instruction execution system, apparatus, system or device. The computer readable medium can be, by way of example only but not by limitation a semiconductor system, apparatus, system, device, or computer memory. The computer readable medium may have suitable instructions for synchronously presenting multiple video program ID streams, such as on a display screen, or for providing for input or presenting in accordance with various embodiments of the present invention.

Figure 2:
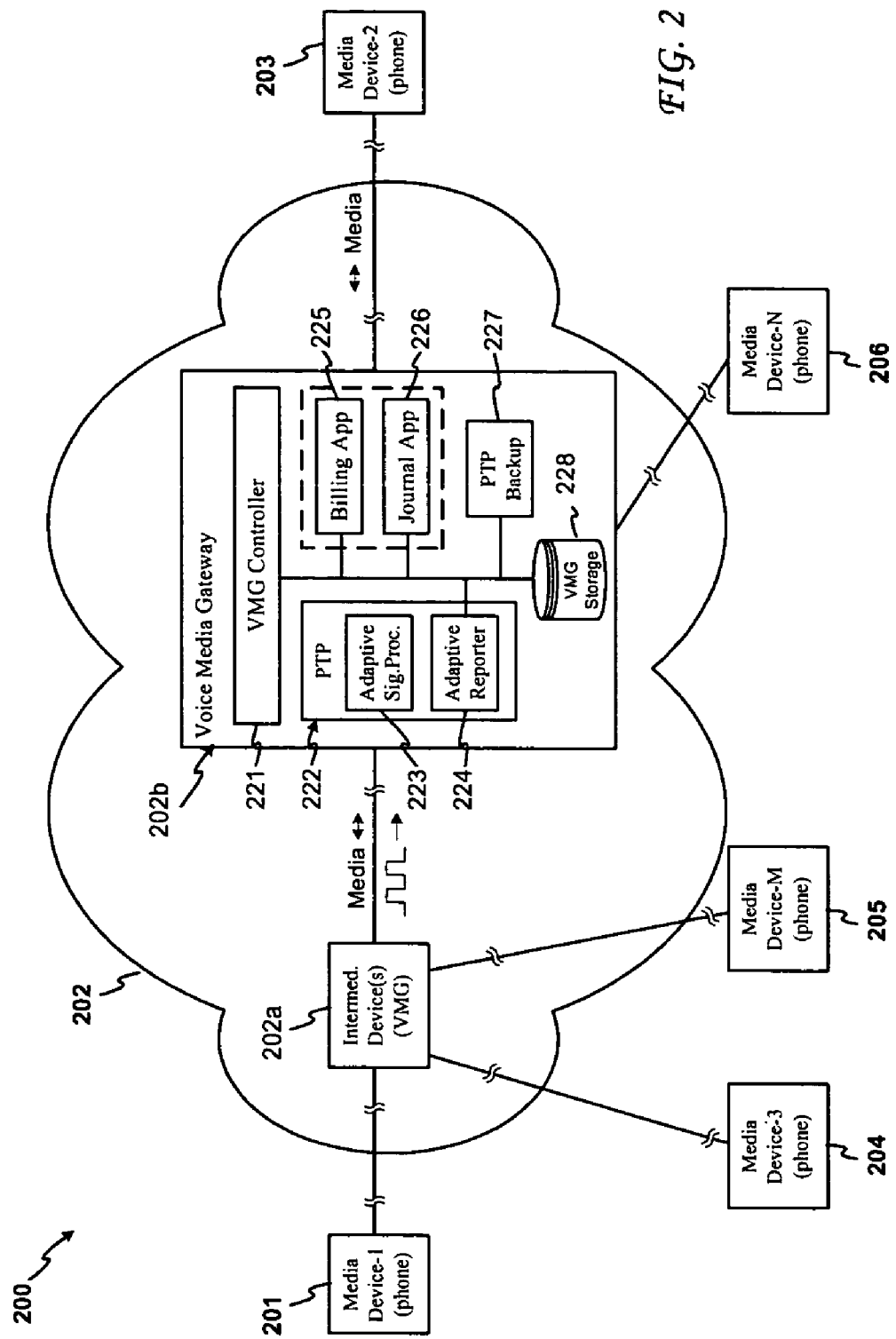
FIG. 2 is a schematic diagram illustrating a system for providing adaptive pulse train monitoring and reporting according to an embodiment of the invention.

Turning now to FIG. 2, a network system 200 is illustrated that is operable in conjunction with an adaptive pulse train processor 202b. The adaptive pulse train processor provides for performing adaptive processing of received pulse train pulses received by a network 200 media gateway in conjunction with an exchange of media (e.g., a phone call) between a first media device 201 (e.g., phone) and a second media device 202 (e.g., phone). Network system 200 includes media device-1 201, network 203 and media device-3 203. Network system 200 further includes additional media devices, such as media devices 3, M and N 204, 205, 206, one or more of which devices can further conduct media exchanges in a similar manner as with devices 1 and 2 201, 203. Network 202 includes intermediate device(s) 202a and voice media gateway (VMG) 202b. (Intermediate devices 202a can, for example, include one or more of network switches, routers, voice media gateways, firewalls or other security, and so on, in accordance with a particular application.

As with conventional systems, telephone calls or other media exchanges may be conducted by a user of a first media device 201 by initiating a phone call or other media exchange. The initiating is routed through a switched network and received by a receiving telephone exchange, VMG or other (initiator-side) intermediate device 202a. The initiator-side intermediate device 202a further routes the initiated media exchange via one or more further intermediate devices (not shown) to a receiver-side VMG 202b, which further routes the initiated media exchange to a recipient media device 203. Such counting is conducted according to an included recipient address (e.g., telephone number).

The first media device 201, or more typically the initiator-side intermediate device 202a, further initiates a pulse train. The pulse train provides a reporting signal (e.g., metering pulses) that may be used for providing billing of the media exchange or other purposes corresponding to a media exchange service provider or one or more of the media device users (e.g., upon initiation or upon establishing a connection channel between the media devices for conducting the exchange). The initiator-side intermediate device 202a may continue to generate the pulse train as a static or frequency-varying signal throughout the exchange, and transfers the pulse train via any other intermediate devices to the receiver-side VMG 202b.

It will be presumed hereinafter that the media exchange includes a phone call so that the invention may be better understood. It should also be understood that other phone calls may be processed in a similar manner as with the media-device-1 201 and media device-2 203 exchange otherwise discussed (e.g., between or among media device-3 204, media device-M 205 or media-device-N 206, any one or more of which may initiate or receive a phone call). Each phone call and its associated pulse train may further be associated with a communication channel according to which phone call and pulse train handling may be conducted independently of other phone calls on other communication channels.

(Note that the term "or" as used herein is intended to include "and/or" unless otherwise indicated or unless the context clearly dictates otherwise. The term "portion" as used herein is further intended to include "in whole or contiguous or non-contiguous part" which part can include zero or more portion members, unless otherwise indicated or unless the context clearly dictates otherwise.)

VMG 202b provides, in addition to receiving and forwarding media and receiving the above-noted pulse train, for processing the pulse train, storing pertinent pulse train processing results and forwarding ones of the results to other network devices for conducting billing or other purposes in accordance with a particular application. Aspects of the pulse train, such as its frequency, pulse count and segment time duration, may be static or variable, and such aspects are unknown to VMG 202b. VMG 202b includes voice media gateway controller (VMGC) 221, adaptive pulse train processor 222, pulse train characteristic utilizing or "external" application 225 (e.g., a phone call billing application, such as advice-of-charge, revenue sharing, and so on), journal application 226, backup pulse train processor(s) 227 and VMG storage 228.

Within VMG 202b, VMGC 221 provides for responding to an initiated exchange by initiating adaptive pulse train processor (ADTP) 222. VMGC 221 further transfers to ADTP 222 otherwise conventional predetermined signal processing constraints including minimum recognition time, maximum recognition time, minimum break time, maximum break time, current receive pattern, previous Rx Pattern and current transmit pattern. VMGC 221 also transfers to ADTP 222 one or more additional control parameters according to which ADTP 222 can adapt its processing of a received pulse train to received pulse train characteristics (e.g., pulse train frequency, pulse counting, segment time duration, and so on), or provide a desirable reporting of such characteristics or information derived therefrom to application 225, journal application 226 or PTP backup 227. VMGC 221 still further transfers to ADTP 222 a received pulse train following ADTP initialization. (It will become apparent that the predetermined signal processing constraints, additional control parameters or the like can also be used for other purposes or some combination in accordance with the requirements of a particular application.) VMGC 221 more preferably downloads the additional control parameters to ADTP 222 as a single integrated pulse identification, notification, and frequency calculation criteria parameter (INFCC). Preferred signal processing constraints and control parameters are also illustrated in Table 1 (below) along with exemplary values for each constraint or parameter. As illustrated in Table 1, an additional parameter, Sig4, further provides one or more pulse train characteristic indicators for indicating pulse train characteristics or a start of sending pulse train characteristics of a given type (e.g., with pulse train characteristics being included as corresponding data). One or more of Sig4 values can be predetermined, transferable to the ADTP (e.g., in conjunction with initialization or reporting of events to a particular application) or some combination thereof.

TABLE 1

Pulse Train Processing Constraints and Parameters

| Signal Name | Value |
|---|---|
| New Rx Bits | 0011 |
| Old Rx Bits | 2222[1] |
| Current Tx Bits | 1110 |
| Min. Make | 90 |
| Max. Make | 120 |

TABLE 1-continued

Pulse Train Processing Constraints and Parameters

| Signal Name | Value |
|---|---|
| Min Break | 25 |
| INFCC | 0, 1 or > 1 |
| Event to Report to Application | Sig 4 |

[1]Bit pattern "2222" indicates that APTP shouldn't care about values of ABCD bits. Similarly, a bit pattern "1022" means that APTP can ignore transitions/bit-values of C and D bits.

Adaptive pulse train processor (APTP) 222 may comprise a digital signal processor (DSP) or other suitable processor for adaptively processing a received pulse train in accordance with embodiments of the present invention. APTP 222 responds to VMGC 221 initiation by initiating adaptive signal processor 223. Adaptive signal processor (ASP) 223 responds by processing received pulse train pulses to determine one or more resulting pulse train characteristics corresponding to the INFCC parameter(s) ASP 223 further transfers the resulting characteristic(s) to adaptive reporter 224. Adaptive reporter 224 responds by transferring the resulting characteristic(s) to one or more of billing application 225, journal application 226, PTP backup 227 and VMG storage 228 according to the INFCC parameter.

The present embodiment more specifically enables ASP 223 and adaptive reporter 224 to process a received pulse differently and provide for transferring a different pulse train indicator in response to each of at least three INFCC parameter values. If INFCC equals a first value (e.g., 0), then ASP 223 determines an occurrence of each successive pulse train pulse on a current communication channel and transfers an indicator corresponding to the pulse occurrence to adaptive reporter 224, which transfers (reports) the occurrence indicator to application 225. If INFCC equals a second value (e.g., 1), then ASP 223 determines a total count of received pulse train pulses on a current communication channel and transfers a total count indicator to adaptive reporter 224, which reports the total count indicator to application 225. If INFCC equals or exceeds a third value (e.g., 2), then ASP 223 determines a pulse train frequency or frequency change for the pulse train corresponding to the current communication channel and transfers a frequency change indicator to adaptive reporter 224, which reports the frequency change indicator to application 225.

While the present embodiment does not require ASP determination of frequency, pulse train segment period or other characteristics responsive to the first two INFCC values, other embodiments may implement these determinations, other determinations or some combination. Such determinations can, for example, be implemented in accordance with the methods illustrated in FIGS. 2 through 4, other suitable methods or some combination. Various embodiments may also implement somewhat different or additional reporting schemes for transferring the same or different ones of pulse train indicators to one or more of application 225, the remaining VMG components or some combination, among other alternatives.

Figure 3:
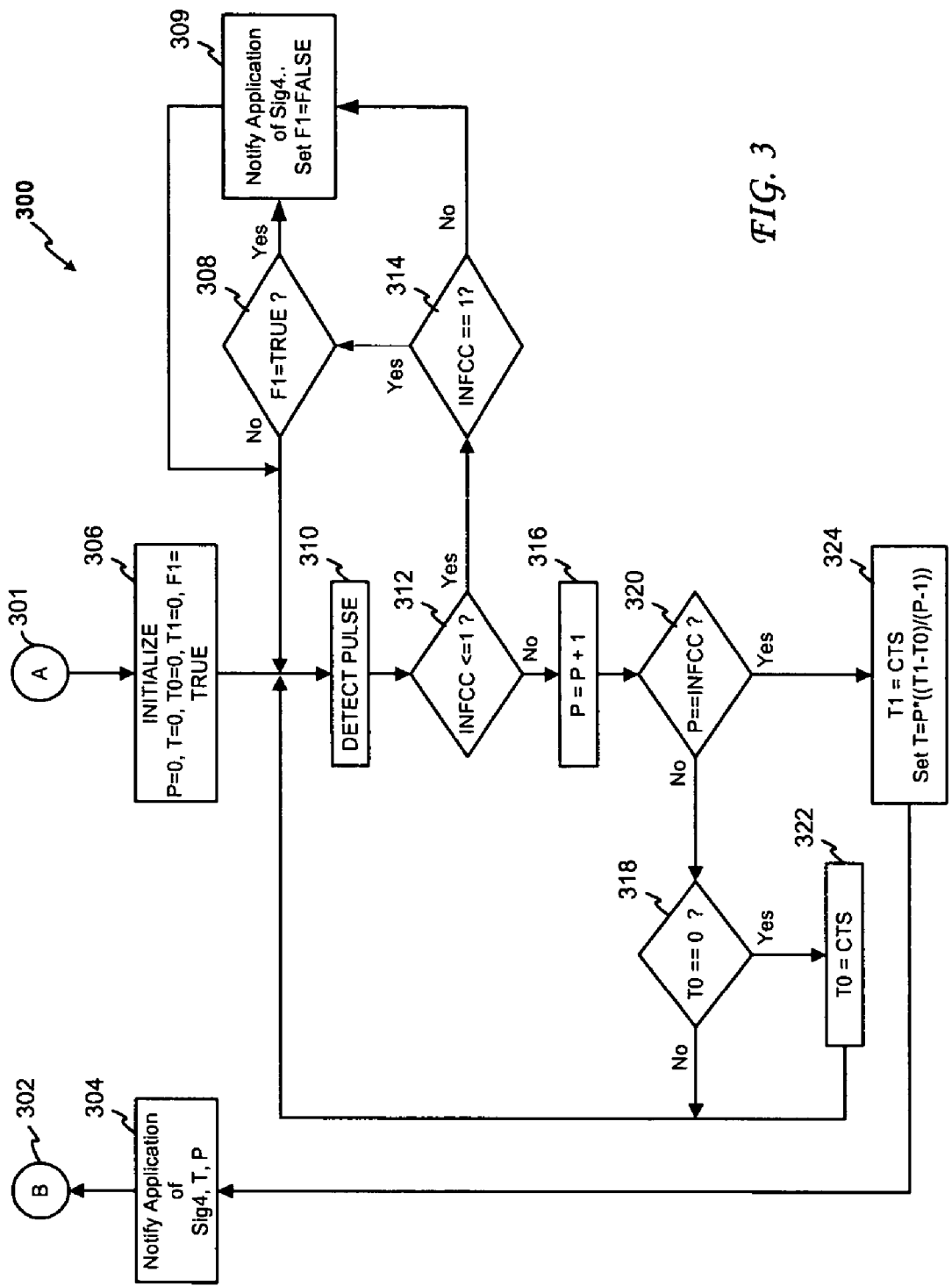
FIG. 3 is a flowchart illustrating a method for determining a number of pulse train pulses according to an embodiment of the invention.
Figure 4:
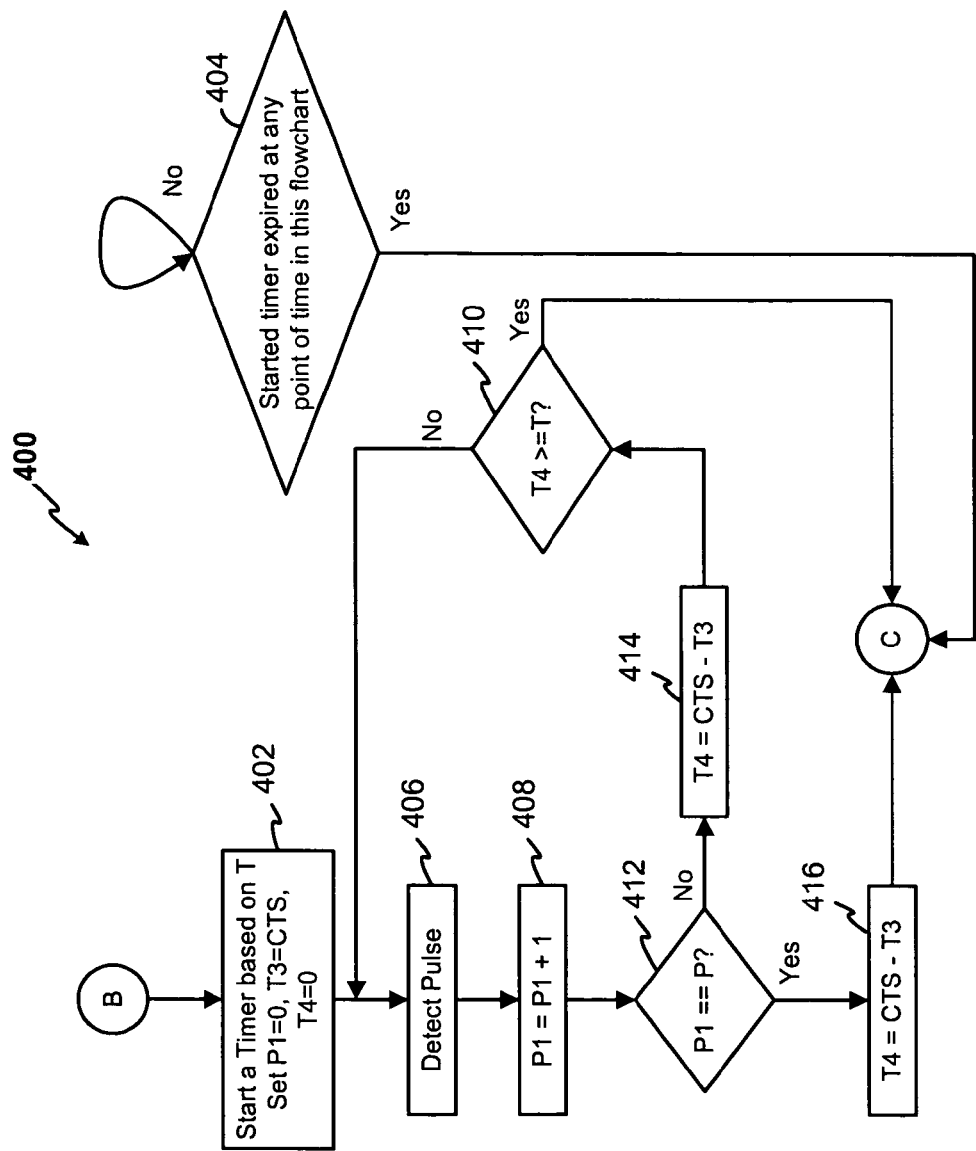
FIG. 4 is a flowchart illustrating a method for detecting a case in which a pulse train frequency remains unchanged for successive intervals or is reduced, according to an embodiment of the invention.

Continuing now with FIGS. 2 through 4, a method is illustrated for adaptively processing or metering pulses in a received pulse train in accordance with an embodiment of the invention. The method provides for determining one or more of pulses occurring within a pulse train segment, a pulse train frequency and a pulse train frequency change in accordance with the aforementioned control parameters, which control parameters are implemented as an INFCC parameter according to the present embodiment. Using a DSP, for example, the method broadly includes determining each pulse train pulse or a time required to detect all pulses in a presumed pulse train segment using an initial or current time interval (T) corresponding to INFCC, and, modifying the time interval to a new required time (T_new) as needed to encompass all pulses within the pulse train segment. The method thus includes dynamically learning or "adapting to" the pulse train by determining changes in a number of pulses or time, and further provides for the aforementioned determinations and reporting. (It is presumed, for clarity sake, that the method is performed by a DSP.)

It is to be understood that the flowcharts provided illustrate examples of one or a few possible types and ordering of steps according to a particular embodiment of the invention. Other embodiments can change the number and type of steps and still achieve the desired functionality. In general, any one or more processors or processing systems may perform combinations of steps in serial or parallel. Steps may further be performed in real time or non-real time and at different geographical locations, as practicable or as desired. Moreover, any suitable processing approach or architecture can be used to achieve the functionality described therein.

Beginning with FIG. 3, the method starts at point A 301 after signal definition information has been received (see initialization above). In step 306, the DSP initializes variables. In step 310, the ASP determines the start of a pulse. Pulse detection can be performed by any suitable method. For example, a preferred embodiment uses a debounce timer to measure a minimum "make time" or "hold time" during which a pulse leading edge must be high in order to be considered the start of a valid pulse.

Figure 1B:
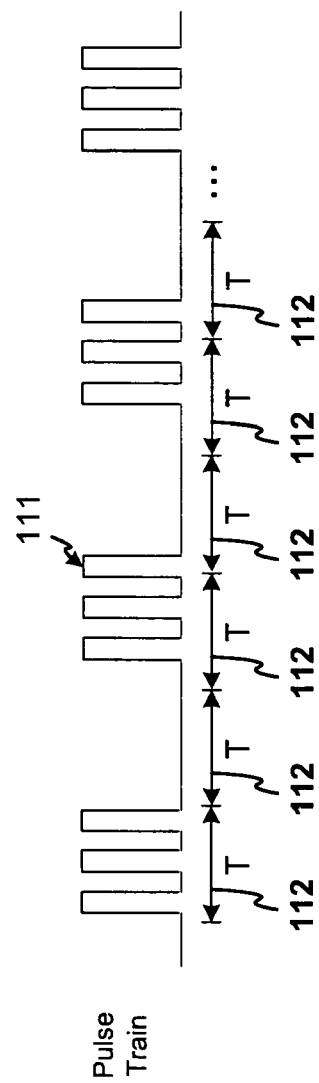
FIG. 1B illustrates a further example of a repetitive signal pulse train as processed according to a prior art pulse train processing method.

In step 312, after the start of a pulse is detected at step 310, the DSP determines whether the value of INFCC less than or equal to one. If INFCC is less than or equal to one, then, in step 314, the DSP determines whether INFCC is equal to one. If INFCC equals one, then, in step 308, the DSP determines whether F1 is set to "TRUE". If F1 is "TRUE", then, in step 309, the DSP notifies an external application (e.g., billing application 125 of FIG. 1) of the start of a pulse and the method continues with step 310 where pulse counting can continue. If instead, in step 308, F1 is "FALSE" then the application is not notified since it has already been notified at a prior time in step 309.

If, in step 314, the DSP determines that INFCC is not equal to 1, then the method continues in step 309 regardless of the state of the F1 flag. Thus, if INFCC equals 0, the application is notified of every pulse, and if INFCC equals 1, the application is notified at only the first pulse.

If, in step 312, the DSP determines that INFCC is greater than 1, then the method determines a time required to detect a number of pulses equal to INFCC and further determines a pulse frequency corresponding to the required time. During pulse counting, step 316 increments the pulse count P every time a pulse is detected. In step 320 the DSP determines whether the pulse count has reached the expected pulse count, INFCC. If not, then the method continues with step 318. If, in step 318, the DSP determines that a start time T0 is not already set (e.g., T0=0), then, in step 322, the DSP determines the start time as corresponding to a Current Time Stamp (CTS), for example, provided by a system clock. Execution of steps 310, 312, 316, 320 and 318 continues until the number of pulses equals the expected number of pulses indicated by the value of INFCC.

When the number of pulses equals INFCC (step 320) then, in step 324 the DSP determines the interval in which INFCC number of pulses occurred. The interval is determined by using start and end time stamps and adjusting for an additional pulse duration (P/(P−1)) that is not counted since the first timestamp was taken at the falling edge of the first pulse. With this correction, the time required to detect INFCC pulses is determined. In step 304, the DSP notifies the application of the event of pulse interval determination by sending the pulse train indicator "Sig4" (e.g., any predetermined indicator value corresponding to such an event) along with the time interval "T" and number of pulses "P" occurring within the time interval (e.g., as Sig4 indicator data, using further pulse train indicators, or some combination). The method then continues at point "B" of FIG. 5.

The FIG. 4 flowchart illustrates a method for detecting a case in which the pulse train frequency remains unchanged for successive intervals or is reduced, according to an embodiment of the invention. In step 402, a timer is started to measure the interval T that was determined in step 324 (FIG. 3). In a preferred embodiment, the timer causes an interrupt to exit the method of FIG. 4 following step 404 at C.

Method 400 begins with step 402, in which the DSP initializes variables including so that P1=0, T3=CTS and T4=0. In step 406, the DSP detects the start of a pulse. The DSP then increments current pulse count P1 step 408. In step 412, the DSP performs a check to determine whether current pulse count P1 equals the previous pulse count P (FIG. 3). If so, the DSP determines a time interval for the occurrence of "P" pulses in step 416 and exits method 400 "C".

If, in step 412, P1 does not equal P, then the method continues with step 414. In step 414, the DSP updates the current time interval. In step 410 the DSP performs a check to determine whether the established (i.e., prior) interval "T" has been met or exceeded. If not, then execution continues to loop back to count additional pulses in steps 406, 408, 412 and 414. Otherwise the method of FIG. 4 exits at "C".

Figure 5:
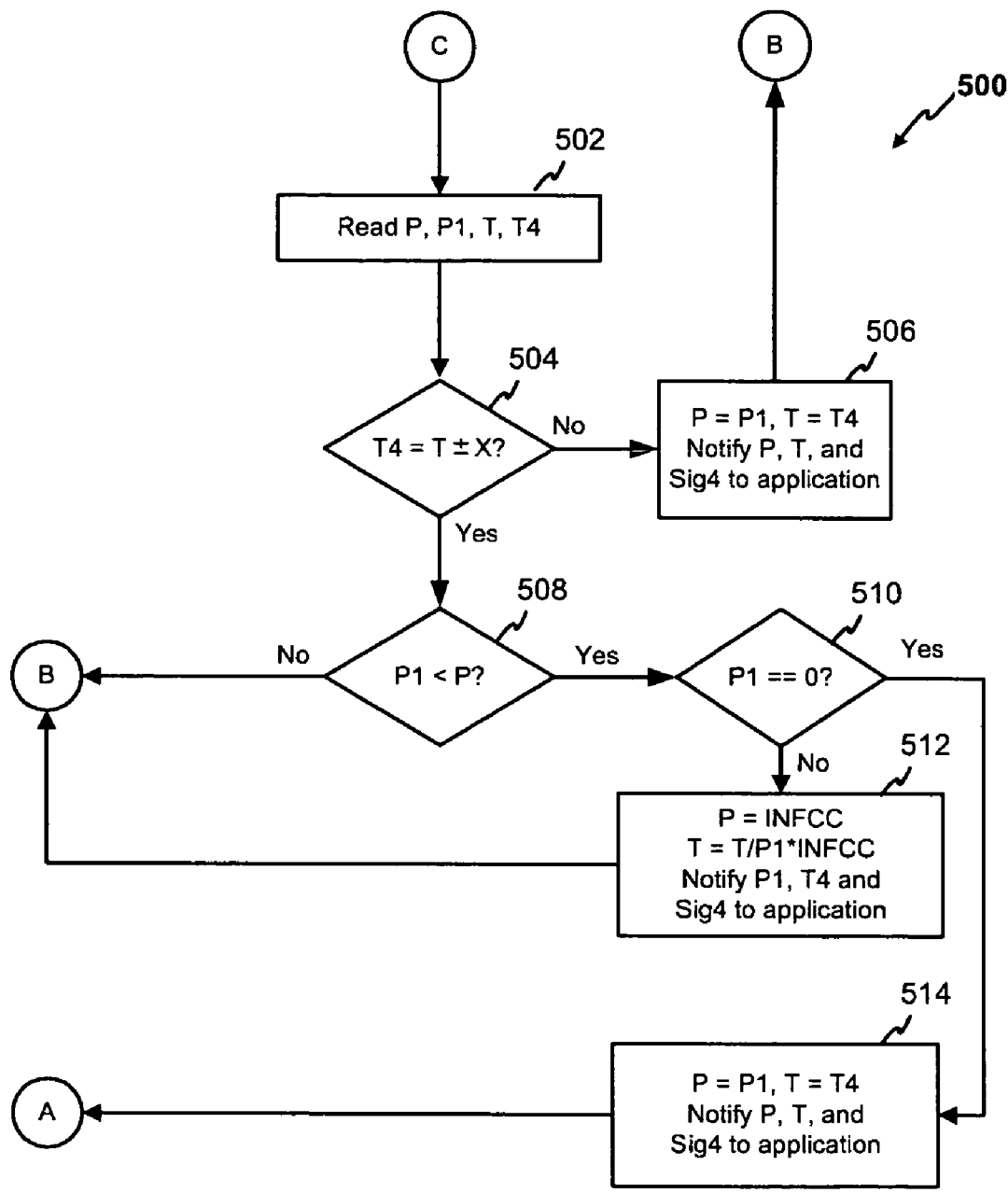
FIG. 5 is a flowchart illustrating a method for notifying an application of a change in received pulse train frequency.

The FIG. 5 flowchart illustrates a method for notifying the application as to changes in pulse train frequency, according to an embodiment of the invention. Method 500 is preferably entered at C from method 400 of FIG. 4.

In step 502, the DSP obtains current values of P, P1, T and T4. In step 504, the DSP determines whether the interval T4 is equal to the prior interval, T, within a time variance, X. Time variance X corresponds to the sensing of a valid pulse leading edge, e.g., the pulse's make time. If not, then the DSP notifies the application (e.g., using a suitable predetermined pulse train indicator) that a frequency change has occurred in step 506 and returns to method 400 (FIG. 4), where pulse monitoring continues.

If, in step 504, interval T4 is equivalent to the expected interval T, then the DSP performs a check to determine a new pulse count's (P1's) relationship to the prior pulse count, P, in step 508. If, in step 508, P1 is not less than P, then pulse monitoring resumes at B in the flowchart of FIG. 3. Otherwise, in step 510, the DSP determines whether P1 is equal to zero. Such determination provides for early detecting and indicating an end of pulse train. If P1 equals 0, then, in step 514, the DSP notifies the application and method 300 (FIG. 3) is resumed to begin a new search for a first pulse. Otherwise, in step 512, the DSP notifies the application of the new pulse frequency (i.e., the count within the interval) and pulse monitoring resumes with method 400 (FIG. 4).

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
receiving pulse train signal processing criteria;
receiving at least one first pulse train processing control parameter having a first value indicating a pulse train characteristic to be produced from a received pulse train;
receiving a first pulse train including first pulse train pulses;
processing the first pulse train according to the first value to produce a corresponding first pulse train characteristic;
transferring the first pulse train characteristic to a pulse train characteristic utilizing application;
receiving a second pulse train processing control parameter having a second value, wherein the second value is different from the first value;
receiving a second pulse train including second pulse train pulses;
processing the second pulse train according to the second value to produce a corresponding second pulse train characteristic, wherein the second pulse train characteristic is different from the first pulse train characteristic; and
transferring the second pulse train characteristic to the pulse train characteristic utilizing application.

2. A method according to claim 1, wherein the pulse train signal processing criteria include criteria selected from a group including a minimum recognition time, a maximum recognition time, a minimum break time, a maximum break time, a current receive pattern, a previous Rx Pattern, and a current transmit pattern.

3. A method according to claim 1, wherein the at least one pulse train processing control parameter indicates processing for determining at least a selected one of received pulse train pulses, a total number of received pulse train pulses, and a pulse train frequency.

4. A method according to claim 3, wherein the at least one first pulse train processing control parameter includes a pulse identification, notification, and frequency calculation criteria (INFCC) parameter.

5. A method according to claim 1 wherein the at least one first pulse train processing control parameter indicates an expected number of pulses to be received.

6. A method according to claim 1, wherein the processing includes producing a pulse indicator corresponding to each received pulse train pulse if the pulse train processing control parameter indicates a first value, determining a total count of received pulse train pulses corresponding to a call if the pulse train processing control parameter indicates a second value, and determining a pulse train frequency change if the pulse train processing control parameter indicates a third value that is different from the first value and the second value.

7. A method according to claim 6, wherein the determining a pulse train frequency change includes:
counting a number of pulses corresponding to a first pulse train segment;
determining a first time interval corresponding to receiving the pulses;
determining a second time interval of a later pulse train segment during which the number of pulses is again received; and
comparing the first time interval and the second time interval.

8. A method according to claim 1, wherein the at least one first pulse train processing control parameter modifies a time interval within which received pulse train pulses are counted.

9. A method according to claim 1, wherein a time interval during which received pulse train pulses are counted is conditionally modifiable in accordance with the at least one first pulse train processing control parameter.

10. A method of claim 1, wherein the transferring includes transferring a pulse indicator to the pulse train characteristic utilizing application each time processing indicates that a pulse train pulse is received.

11. A method of claim 1, wherein the transferring includes transferring a pulse count total indicator to the pulse train characteristic utilizing application corresponding to a conclusion of a telephone call to which the pulse train corresponds.

12. A method of claim 1, wherein the transferring includes transferring a frequency change indicator to the pulse train characteristic utilizing application each time processing indicates a pulse train frequency change.

13. A method according to claim 12, wherein the transferring further includes transferring to the pulse train characteristic utilizing application a time interval within which pulses are received according to the frequency change and a number of pulses within the time interval.

14. A method according to claim 1, wherein the pulse train comprises a metering signal according to which a telephone call is billed.

15. A system comprising:
means for receiving pulse train signal processing criteria;
means for receiving at least one first pulse train processing control parameter having a first value indicating a pulse train characteristic to be produced from a received pulse train;
means for receiving a first pulse train including first pulse train pulses;
means for processing the first pulse train according to the first value to produce a corresponding first pulse train characteristic;
means for transferring the first pulse train characteristic to a pulse train characteristic utilizing application;
means for receiving a second pulse train processing control parameter having a second value, wherein the second value is different from the first value;
means for receiving a second pulse train including second pulse train pulses;
means for processing the second pulse train according to the second value to produce a corresponding second pulse train characteristic, wherein the second pulse train characteristic is different from the first pulse train characteristic; and
means for transferring the second pulse train characteristic to the pulse train characteristic utilizing application.

16. A system according to claim 15, wherein the means for processing includes means for producing a pulse indicator corresponding to each received pulse train pulse if the pulse train processing control parameter indicates a first value, determining a total count of received pulse train pulses corresponding to a call if the pulse train processing control parameter indicates a second value, and determining a pulse train frequency change if the pulse train processing control parameter indicates a third value that is different from the first value and the second value.

17. A system according to claim 15, wherein the means for processing and the means for transferring include a digital signal processor (DSP).

18. A system according to claim 17, wherein the DSP is hosted by a voice media gateway (VMG).

19. A computer-readable storage device having stored thereon instructions for:
receiving pulse train signal processing criteria;
receiving at least one first pulse train processing control parameter having a first value indicating a pulse train characteristic to be produced from a received pulse train;

receiving a first pulse train including first pulse train pulses;

processing the first pulse train according to the first value to produce a corresponding first pulse train characteristic;

transferring the first pulse train characteristic to a pulse train characteristic utilizing application;

receiving a second pulse train processing control parameter having a second value, wherein the second value is different from the first value;

receiving a second pulse train including second pulse train pulses;

processing the second pulse train according to the second value to produce a corresponding second pulse train characteristic, wherein the second pulse train characteristic is different from the first pulse train characteristic; and transferring the second pulse train characteristic to the pulse train characteristic utilizing application.

* * * * *